No. 775,773. PATENTED NOV. 22, 1904.
W. KOUNS.
HAY OR GRAIN LOADER OR UNLOADER.
APPLICATION FILED JUNE 10, 1902.
NO MODEL. 2 SHEETS—SHEET 1.
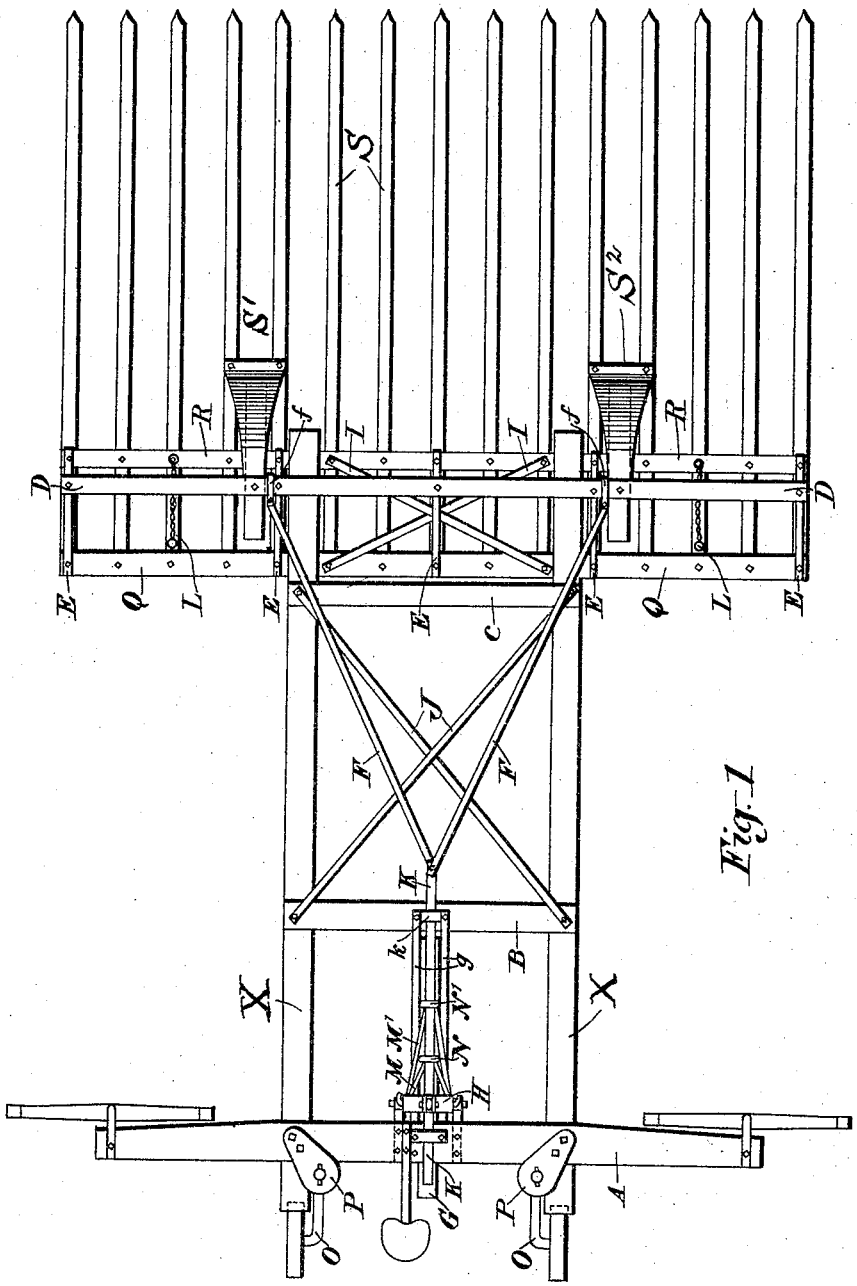
WITNESSES:
INVENTOR No. 775,773. PATENTED NOV. 22, 1904.
W. KOUNS.
HAY OR GRAIN LOADER OR UNLOADER.
APPLICATION FILED JUNE 10, 1902.
NO MODEL. 2 SHEETS—SHEET 2.
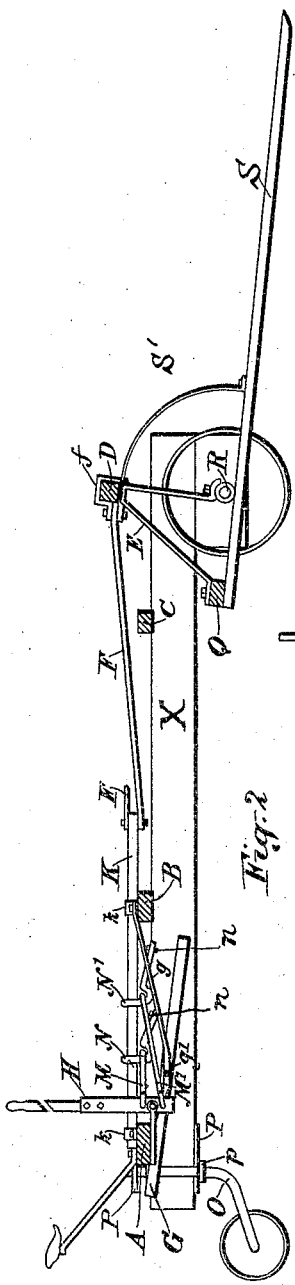
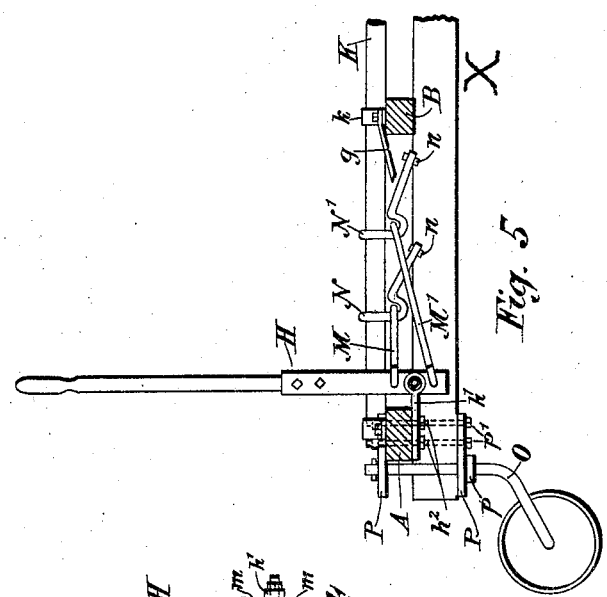
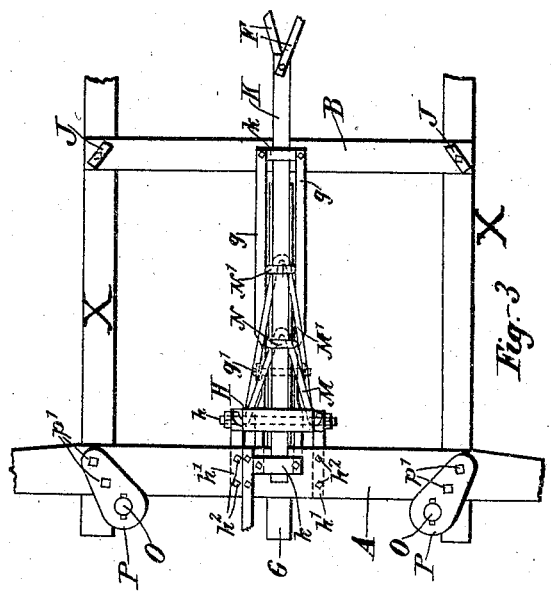
WITNESSES:
INVENTOR
Wesley Kouns
BY E. M. Marble
his ATTORNEY No. 775,773. Patented November 22, 1904.

UNITED STATES PATENT OFFICE.

WESLEY KOUNS, OF SALINA, KANSAS.

HAY OR GRAIN LOADER OR UNLOADER.

SPECIFICATION forming part of Letters Patent No. 775,773, dated November 22, 1904.

Application filed June 10, 1902. Serial No. 110,952. (No model.)

*To all whom it may concern:*

Be it known that I, WESLEY KOUNS, a citizen of the United States, residing at Salina, Kansas, have invented certain new and useful Improvements in Hay or Grain Loaders or Unloaders, of which the following is a specification.

My invention relates to hay and grain loaders, carriers, and unloaders, and particularly to that class known as "push-rakes," in which the rake-teeth are arranged in front of the horses.

The object of my invention is to provide a machine by which hay and grain may be gathered upon a loader and then carried to a desired point, where it may be unloaded.

The machine is to be operated by two horses in the rear of the rake or carrier, one on either side of the push-beams. To load up the rake or carrier, the points of the teeth should rest on the ground and then be shoved forward under the hay or grain. When loaded, the points of the teeth are raised by the means described to any desired height to carry the hay or grain clear from the ground. To unload the carriers, the points of the teeth are dropped on the ground and carried back out from under the load by means of chains attached to the axle of the carrier and to the breast or choke straps of the harnesses of the horses.

I am aware that the teeth, axle, back cross-beam of teeth, and push-bars are old; also fenders, wheels, and seat; but the other portions of the machine shown in the drawings accompanying my application are new.

Figure 1 is a plan view of my machine, showing the teeth of the rake or carrier raised to carry the load to any desired place. Fig. 2 is a sectional view showing the teeth of the rake or loader down in position to load or unload the hay or grain. Fig. 3 is an enlarged plan of the lever and draw-bar mechanism forming part of the machine. Fig. 4 is a front view of the double lever, showing the hinge and hinge-straps. Fig. 5 is an enlarged sectional view showing lever and draw-bar mechanism excepting the foot-lever, which is here omitted to allow a plainer view.

The framework of the machine comprises cross-beams A, B, and C and longitudinal timbers or push-beams X. This framework supports and sustains the operating mechanism. From the front axle R is hung a rake comprising teeth or tines S, a transverse beam Q, forming the back of the rake, another transverse beam, D, raised considerably above the level of the teeth, and braces E, connecting beams D and Q. These braces, with the beams D and Q, form a truss which strengthens and gives firmness to the rake. The axle R and back beam Q are further connected by diagonal braces I, which also serve to stiffen the rake. Other diagonal braces, J J, connect the ends of transverse beams B and C and stiffen the framework.

For raising and lowering the rake I provide a hand-lever H, bifurcated at the lower end and pivotally connected to the framework. Two draw-rods F connect the upper transverse beam D of the rake with a longitudinally-movable draw-bar K, arranged to move in suitable guides carried by the framework. The hand-lever H is arranged to move this draw-bar backward to raise the rake by means of a friction-ratchet mechanism comprising friction clamps or grabs N and N', connected to the hand-lever H by links M and M', respectively, link M being connected to the hand-lever above the pivot of the latter and link M' being connected to the hand-lever below the pivot thereof. When the lever H is drawn backward, the link M, operating the friction clamp or grab N, causes the same to grasp the draw-bar K and pull the same backward. In like manner when the hand-lever H is pushed forward the friction clamp or grab N' is operated by the link M' and caused to grasp said draw-bar, (friction-bar N releasing said draw-bar,) and the draw-bar is drawn backward still farther. Both motions of the hand-lever H serve, therefore, to raise the rake. To lower the same, I provide a pivot foot-lever G. When one end of this lever is depressed, the other end rises, so as to make contact with the adjusting-bolts $n\,n$ in the long ends of friction-clamps N N', thereby raising both the said clamps, releasing the draw-bar, and permitting the same to move forward by the weight of the rake. The rake may be checked at any point in its descent by releasing the pressure on the foot-lever and operating the hand-lever H.

Lever H is attached to cross-beam A by means of the two strap-hinges $h'$, bolted through cross-beam by bolts $h^2$ and is pivoted on bolt $h$, passing through strap-hinges $h'$. When lever H is moved forward, double hook M, attached to grab N, is pushed forward on bar K, and by the same movement of lever H double hook M', attached to grab N', is pulled backward toward the operator, drawing bar K with it and raising points of teeth. When lever H is pulled backward, double link M, attached to grab N, is pulled backward, drawing bar K and raising points of teeth. By the same movement double link M', attached to grab N', is pushed forward, thus reversing the first movement of hooks and grabs.

In grabs N and N' the long end bears down and binds the neck of the grab on bar K; but when pushed forward by double hook the tendency to bind is overcome, as the double hook tends to raise the long end of the grab. Thus when lever H is released at any time the bar K is held in position. The long ends of grabs N and N' are provided with bolts $n\ n$, which can be adjusted in such manner that when lever G is forced upward both grabs will be struck and released at one and the same time. Foot-lever G is supported by means of the straps $g\ g$ and bolts $g'$ as a pivot. The front end of lever G being longer and heavier than the back end, it hangs down and clear of grabs until called into use, which is done by means of a downward pressure of the foot of the operator upon short end which is adjacent to the seat and operator. The supporting-straps $g\ g$ are bolted to cross-heads A and B.

Bar K consists of a round bar working in guides $k\ k$, to the end of which are fastened draw-rods F F, which are fastened to clevises $f\ f$ on cross-beam D. Cross-beam D is firmly secured to rake or tooth frame and axle R by means of five truss-braces E, which are attached to back cross-beam of teeth, cross-beam D, and axle-bar R.

Cross-beam D is fastened to truss-braces E flatwise to give greater strength and firmness in such manner that when pulled backward all the points of the teeth are raised evenly and at once, so that when draw-bar K is pulled back and cross-beam D is drawn back by draw-rods F F and clevises $f\ f$ the points of teeth are raised evenly and held securely and firmly, as the five truss-braces E form a secure and stiff bridge, and S' S² represent shields or fenders for protecting the wheels carrying the rake and the forward parts of the machine. These shields or fenders are secured under the cross-beam D and curving downwardly are secured to two of the teeth S of the rake. The single-piece crank-axle and swivel O is so formed as to act as all these act, and each is fastened by means of the plates P. Plates P P P P are securely held by bolts $p'$, which pass through the plate P, cross-beam A, push-beam X, and lower plate P, holding all securely and firmly together. The crank-piece O is provided with a flange-bearing $p$ to sustain machine and is also provided with a slot and pin in upper end.

Having thus fully described my invention and the manner of using it, what I claim, and desire to secure by Letters Patent, is—

1. In a hay and grain loader and unloader, the combination with a working frame comprising cross-beams A, B, and C, and push-beams X, X, a rake pivotally connected thereto, and a draw-bar connected to the rake, of a pivoted hand-lever and two friction-ratchets operated thereby for raising said rake; said ratchets being connected to said lever on opposite sides of its fulcrum and arranged, one, to engage the draw-bar in the forward movement of said lever, and the other, to engage the same in its backward movement, substantially as and for the purpose specified.

2. In a hay and grain loader and unloader, the combination with a working frame, a rake pivotally connected thereto, and a draw-bar connected to the rake for raising the same, of a friction-grab mounted on said draw-bar, a hand-lever connected to said grab; said grab being arranged to grip the draw-bar in its backward movement and to move freely over the same in its forward movement, holding means for preventing the return of the draw-bar when released by the grab, and means for releasing the draw-bar from the grab, substantially as and for the purpose specified.

3. In a hay and grain loader and unloader, the combination with a working frame, a rake pivotally connected thereto, and a draw-bar connected to said rake, of a pivoted hand-lever for raising said rake, two friction-grabs mounted on said draw-bar and connected to said lever on opposite sides of the fulcrum by links M, M', each grab arranged to grip the draw-bar in its backward movement, and to move freely over it in its forward movement, and a foot-lever for releasing the draw-bar from said grabs and lowering the rake, substantially as and for the purpose specified.

4. In a hay and grain loader and unloader, the combination with a working frame, a rake pivotally connected thereto, a draw-bar connected to the rake for raising the same, friction-grabs mounted on said draw-bar, means for operating the draw-bar, and means for releasing said draw-bar from the grabs, of a truss, comprising transverse beams D and Q, braces E, and axle R, for raising and carrying the rake, and supports for the working frame and the truss, substantially as and for the purpose specified.

5. In a hay and grain loader and unloader, the combination with a working frame, a rake, the draw-bar K, and the pivoted operating-lever H, of grabs N, N', provided with bolts $n$, $n$, the links M, M', attached to said lever at points on opposite sides of the pivot thereof and connected to said grabs, and supports for sustaining said frame and the driver, substantially as described.

In testimony whereof I, WESLEY KOUNS, have signed my name to this specification, in the presence of two subscribing witnesses, this 5th day of June, 1902.

WESLEY KOUNS.

Witnesses:
 W. T. WELCH,
 A. K. EKSTRAND.